United States Patent Office 2,811,760
Patented Nov. 5, 1957

2,811,760

METHOD FOR THE PRODUCTION OF CASTING MOULDS

Clifford Shaw, Hildenborough, Tonbridge, England, assignor, by mesne assignments, to Shaw Process Development Corp., Port Washington, N. Y.

No Drawing. Application March 8, 1954,
Serial No. 414,884

Claims priority, application Great Britain April 1, 1953

15 Claims. (Cl. 22—193)

This invention generally relates to metal castings and especially to the method of producing casting moulds for effecting precise castings, and is a continuation-in-part of co-pending application Serial Number 347,829, filed April 9, 1953 by Noel Shaw, entitled, "Metal Casting, Moulds Therefore and Their Production."

That application covers a method of producing casting moulds wherein the mould material is prepared in situ from a mixture composed of finely ground refractory material and a binder, of a low alkyl silicate type, such as ethyl or methyl silicate and an aqueous acid gelling agent, and in which mixture hydrolysis of the binder is effected, whereby alcohol is formed which escapes from all surfaces of the mould. That alcohol is ignited the moment the surfaces of the mould have set by gelling.

The ignition and burning of the alcohol at all outer mould surfaces rapidly hardens these surfaces and effect their rapid solidification and setting, thereby preventing changes in the external mould dimensions. As these outer mould surfaces set and harden, the interior mass or body of the mould material contracts independently of the set outer mould surfaces so that their dimensions remain unchanged. That contraction of the interior mould body manifests itself by a uniform formation throughout the mould body of numerous microfissures, thereby rendering that body uniformly porous. That porosity of the mould is highly desirable when the mould is used for metal casting in that that porosity obviates the provision of heretofore required vents for the removal of air and gases. In addition to the fact that by the aforesaid method the exact external dimensions of the mould are preserved, these moulds prove remarkably stable to heat shock or abrupt fluctuations of temperature.

The above outlined method is confined to the use of an alkyl silicate binder, which changes through hydrolysis into a volatile, combustible alcohol. That liquid is then evaporated from the mould body, and since it is combustible, it is ignited and thus conveniently starts a rapid, simultaneous and uniform heating of all the external mould surfaces, thereby causing a fixating or "freezing" of the external mould dimensions.

It has now been found that the principle of fixating or "freezing" of the external mould dimensions by a rapid and moreover uniform heating of the total surface of the mould can be applied to moulding mixtures containing binders which do not yield combustible volatiles upon setting. In the preparation of such casting moulds liquid, semi-liquid or paste-like substances are used which do not evaporate readily. These are subjected, when the mould has set, to a heat shock, that is an intensive and rapid heating applied simultaneously and uniformly to all mould surfaces, thereby forcing any evaporable substances contained in the mould mass to rapidly escape. That heat shock is effected the moment the mould has gelled, but has not yet appreciably shrunk due to slow evaporation of liquids in the mould mix. This aforesaid method of intense and rapid generation of heat applied to the mould does not depend upon the combustion of any combustible components, since by definition there are none.

According to the present invention, therefore, in the preparation of casting moulds for metals or other mould bodies, a pattern is enveloped by a liquid, semi-liquid or plastic moulding mixture consisting of finely ground refractory material and a liquid binder. Such moulding substance is poured into a moulding box, is allowed to gel i. e. to set, so that it can be handled without causing damage to it, and then the pattern is removed from the mould. According to this invention, the mould or the aforesaid mould body is subjected to a heat shock by rapid and uniform application of intense heat to all the surfaces of the mould, immediately after it has set, but before an appreciable shrinkage caused by evaporation has occurred. Evidently the temperature applied to the surfaces of a mould prepared from the aforesaid moulding mixture must be considerably higher than would be required for the liberation of combustible volatile components. Upon the applied heat shock, an immediate and complete hardening of the external mould dimensions takes place as well as a uniform formation of micro cracks in the internal structure of the mould mass, thus rendering the latter uniformly porous.

The invention can be employed with advantage in the preparation of casting moulds in using a moulding substance which contains finely ground refractory materials and a binder, the latter being preferably formed by precipitation of an inorganic silicate, such as potassium or analogous silicates, whereby the conversion of the formed sol into a gel is effected. In the moulding compound there can also be employed other liquids and setting binders, for example, binders obtained by means of magnesia and phosphoric acid, both well known in the art.

The invention makes it possible to prepare accurate mould without employing the slow, time consuming drying method, considered to be necessary in heretofore used mould making. Much time and a considerable storage space during the drying period of the moulds can be saved hereby. Furthermore, moulds prepared according to the present invention possess an increased resistance against abrupt temperature changes.

In carrying out the invention in greater detail, refractory materials, as for example alumina silicate, magnesia, clay, fused alumina, powdered silica, zirconium dioxide and zirconium silicate, etc. are worked-up into a mouldable slurry by means of an aqueous base liquid binding agent and used for the preparation of a mould around a pattern. After the setting, and if so desired, after separation of the mould into separate parts, this mould is placed on a grate or is in other ways arranged or supported so that it is possible to apply simultaneously and rapidly intense heat from all sides, and so that volatiles will be forced to escape rapidly and as much as possible completely. For example the mould on the grate is put into a muffle furnace which is pre-heated to a temperature of approximately 700 to 800 degrees centigrade, which is considerably higher than would be necessary for the simple drying of the mould, or the mould is subjected to directed and controlled series of open flames.

By way of example the following materials are mentioned as binding agents which may be employed in carrying the present invention into effect: inorganic binding mediums, such as inorganic silicates, especially sodium silicate and potassium silicate (the latter particularly in the form of aqueous sols) and phosphates.

The period of time which may be allowed to elapse between the setting and the rapid heating of the mould depends on the volatility of the evaporating liquid medium, whereby the principle is to be borne in mind that any shrinkage by evaporation is to be avoided before the external surfaces are fixed or frozen by the rapid heating. Since in all these cases the volatile component is water, this interval of time is not as critical as in the case of the aforementioned method where the volatile component employed is an organic liquid, such as alcohol, which by definition evaporates more quickly than water.

The present invention can also be used with advantage in connection with a method in which before the baking of the mould the surfaces of the latter are insufflated with a fine metal powder passing for instance a 300-mesh sieve, in order to assist the formation of nuclei in the casting metal on the surface of the mould. Such insufflation is carried out while the mould surface is still moist, or after it has been covered with a suitable binding agent.

The fine metal powder above mentioned is a matter of choice and depends upon the metal or metal alloy to be cast. Thus for certain castings aluminum powder has been found useful, whereas for other castings nickel, copper, magnesium or other metal powders may be employed.

The reactions taking place in carrying out the present invention are not clarified in all details. Nevertheless it can be stated without limiting the present invention in any way, that through the uniform and rapid application of intense seat to all surfaces of the mould, these surfaces are brought to a rapid, complexe fixation and hardening, so that the desired external dimensions of the mould remain unchanged.

During the rapid hardening of the exterior mould surfaces, there occur in the interior mass or body of the mould fine fissures and crevices throughout, which are so minute that in the process of casting the metal cannot infiltrate, while on the other hand these microfissures facilitate an unrestricted escape of gases and vapours during the casting process.

In order to achieve such microfissure formation in the mould body, the removal of volatiles after the mould has been formed and when it has set should take place as rapidly as is physically possible. As a result, the ground mould mass cracks uniformly throughout the body and the cracks or microfissures are very fine and are formed in such a manner that the minute fragments of the mould body separated by these microfissures are substantially of the same order or size. The individual fragments so produced are of a complicated form and are not rigidly joined together but are interlocked and dovetail; nevertheless the mould as a whole behaves like a solid body, while on the other hand the expansion and contraction of the individual fragments forming the internal mould body structure is rendered possible, without disturbing the external dimensions of the casting mould as a whole.

As stated, the microcracking of the internal mould structure is uniform and even and must be so, since if it is not uniform and even distortion of the mould body will take place, unless it is of the simplest form.

According to the present invention it is essential that the particles of comminuted refractory be separated by a colloidal ground mass or gelled structure. This clearly distinguishes in principle over previous techniques in which an essential objective is the consolidation and compacting of the refractory particles by vibration or otherwise aiming to achieve as nearly as possible complete contact between them. This is true both for sand casting and precision lost wax casting, as well as being normal practice in the refractories industry in general and indeed in all the art in which it is sought to bind together aggregate. It is an essential in achieving the presently desired opposite aim that setting or gellation of the mass as such should take place with a minimum of disturbance, since such disturbance tends to cause compacting of the refractory particles, which is very undesirable as it leads to distortion of the mould body.

According to the present invention it is necessary to prepare a mobile slurry containing a substantial amount of liquid, obtained by mixing comminuted refractory material with a wet binder. The thus prepared mobile slurry is then poured over patterns placed in suitable containers as is well known in the art. As soon as the slurry has set, and according to the conditions described hereabove, the non-combustible volatile is rapidly removed by the application of a proper thermal shock, as, for instance, by placing the gelled mould into a pre-heated furnace.

The binders may be prepared, as is well known in the art (see for example Collins U. S. Patent No. 2,380,945), from inorganic silicates, such as for example: sodium silicate and an acid such as nitric acid, or weak alkaline colloidal silica solution and a gelling accelerator; or a weak acid colloidal silica solution and a gelling accelerator; or, as is well known in the art, from phosphates such as, for example, ammonium phosphate and magnesium oxide in a water medium. In each case, once the slurry has set, the resulting volatile which is water must be rapidly removed from the mould as described.

The rapid, high temperature heating of the mould can be possibly effected by the introduction of the mould into a chamber heated electrically, as by induction or resistance.

By the present method the preparation of a casting mould with an extraordinarily smooth casting surface is made possible, without the use of multi-layered moulds. However, it is also possible to prepare the mould in layers and to use for the casting surface especially finely grained refractory materials, a fact which is generally known. It is also possible to strengthen the binding effect between the casting surface and the mould body material by an intermediate connecting layer or by a suitable choice of various binding media. For example it is possible to use as casting surface a moulding substance containing alkaline silica sols, while using for the remaining body of the mould a weak silicic acid sol as binding agent. The compound formed by the neutralization of the two agents produces strong adherence of the casting surface to the main body of the mould.

Becoming more specific as to the composition of the slurry and the temperatures required to produce the intended results of fixating or "freezing" the outer dimensions of the mould and effecting a uniform and evenly distributed micro-cracking of the internal body structure of the mould, the following typical example will apply:

Refractory material

Good results were obtained by the use of comminuted sillimanite (kyanite) prepared in the following typical grading:

| Sieve Size | Percentage |
|---|---|
| ranging from −10 to +16 | 40.3 |
| ranging from −16 to +22 | 7.6 |
| ranging from −22 to +30 | 5.8 |
| ranging from −30 to +44 | .7 |
| ranging from −44 to +60 | .7 |
| ranging from −60 to +100 | 4.7 |
| ranging from −100 to +150 | 6.4 |
| ranging from −150 to +200 | 5.4 |
| ranging from −200 | 28.4 |

The above graded refractory powders are mixed at the percentages stated, and there is preferably added a controlling agent for timing the gelling, such agent preferably constitutes 2% of either a sulphate, such as Epsom salts or commercial gypsum, or a specially prepared gypsum, known as "thistle plaster." Obviously other suitable controlling agents may be used, their choice depending upon the slowness or rapidity of gelling desired. The above specified agents will retard gelling.

Liquid medium

According to the present invention an aqueous gelling medium is used. For example, a solution is prepared containing metallic silicate, such as potassium silicate, which is mixed with water to a concentration of approximately 60 degrees Baumé.

The above given refractory material is mixed with the aqueous gelling medium in approximately the following proportion:

Gelling medium _____ ccs__ 110
Refractory material, including the controlling agent _____ grms__ 132

These two ingredients are mixed to form a slurry which remains mobile for approximately 45 seconds, during which time it is poured either over a pattern or into a container into which the pattern is placed.

After the above stated period the mixture suddenly gells, and while in that stage the pattern is removed without damage or distortion of the impression made by the pattern.

Since the mould composition is produced with an aqueous base, evaporation of the water contained therein is relatively slow and therefore there occurs no appreciable shrinkage between the time of the removal of the pattern and the firing of the mould.

The firing of the mould

The stripped mould is now placed in a pre-heated muffle furnace kept at temperatures either between 500 to 600 degrees centigrade for moulds of small or medium sizes for producing castings up to say 15 pounds in weight, or between 700 and 800 degrees centigrade for larger sized moulds, at which temperatures the water content of the mould material is vigorously, and therefore rapidly removed. As a result of the rapid evaporation of water from the mould material the outer surfaces of the mould become fixated or "frozen" at the dimensions imparted to the mould by the pattern, whereas the interior body structure of the mould becomes uniformly crazed or cracked. That interior micro cracking is due to the fact that the comminuted particles of the rafractory material are originally physically separated from one another by the aqueous gell, and these particles remain separated after the mould is fired and the water is driven off from the gell. However, these refractory particles become interlocked and are dove-tailed with one another, but due to their physical separation, the interior structure of the mould formed by these interlocked particles can readily contract or expand without affecting the exterior surface dimensions of the mould.

A mould produced according to the above outlined example is particularly intended for casting metals or alloys of a relatively low melting point, that is a melting point lower than those of steel or steel alloys. The reason for this limitation is that the mould thus produced is not sufficiently refractory for metals or alloys of high melting points.

Alternative application

When it is desired to use the above mould composition, which is relatively inexpensive, for high melting point metals and alloys, there has been found a useful employment of that composition as a support or outer envelope for a highly refractory inner layer, facing or lining which will withstand high melting point temperatures. Such lining or facing can be produced in accordance with the first-mentioned co-pending application Serial Number 347,829. That composition would contain, for example, an ethyl silicate base slurry which is prepared by mixing comminuted sillimanite of the percentual grading given in the above example, with a liquid medium in the form of an ethyl silicate, having a silica content ranging from 40% to 45%, and which ethyl silicate is hydrolyzed in association with denatured alcohol and distilled water, the above effected liquid medium constituting a colloidal solution of silica in alcohol.

As a gelling or gelling control agent there is used, for example, two ounces of ammonium carbonate dissolved in one pint of water. The proportions of the different ingredients in the above ethyl silicate base slurry would be, for example, as follows:

Comminuted sillimanite _____ grms__ 100 to 320
Liquid medium _____ ccs__ 100
Gelling agent _____ ccs__ 5

After having thoroughly mixed these ingredients, the resulting slurry is poured over the face of the pattern or model and forms, when gelled, a thin skin or coating of say one-thirty-second of an inch thickness. The gelling of that slurry will take approximately one and a half minutes, and while the gelling takes place the coating may be dusted with a coarse sillimanite powder (—10+30) to furnish a keyed back or anchorage for the outer aqueous base slurry given in the first example, which is now applied as an envelope or backing over the ethyl silicate base coating or facing. When that backing has gelled the mould is stripped in the usual manner. As a result of the use of the two slurry compositions there is produced a mould structure having a sturdy but inexpensive outer layer which supports and reinforces a highly refractory facing for all critical casting areas of the mould structure.

From the foregoing description of the present method it becomes quite evident that for producing the desired mobile slurry for low melting point castings it is required to mix comminuted refractory material with a wet binder, or with a wet binder and wet gelling agent, from both of which latter ingredients liquid matter is to be rapidly removed, however, neither of them are to contain combustible volatiles.

That rapid removal of liquid matter from the gelled mould effected by a severe heat shock applied uniformly and simultaneously to all mould surfaces is dependent on to produce a mould characterized by the features of retaining exactly its originally imparted to external dimensions and having a uniformly porous interior structure.

Obviously both the choice of refractory material as well as the choice of the binder and the gelling agent will largely depend upon the metals to be cast in the mould so that the most suitable mould ingredients for the best production of specific castings are employed.

While a series of examples of binders are given herein, it is evident that the present invention is not to be restricted to just the few ingredients stated, and that variations and changes in the composition of the slurry may be effected, depending upon the type of material to be cast, such changes or modifications being deemed to reside within the broad scope of this invention, as defined in the annexed claims.

What is claimed as new is:

1. Method of producing refractory moulds which comprises preparing an aqueous slurry comprising a refractory filler and an inorganic non-flammable binder and a gelling accelerator, pouring said slurry over a pattern, allowing the slurry to gel, immediately separating the gelled mass of the slurry from the pattern, and immediately heating the gelled mass to rapidly drive off water in vapor form, thereby to fix the external mould dimensions and obtaining a mould having an interior structure of micro-cracks which will not allow cast metal to fill the crack formation, but which will facilitate the ready escape of gases during the casting of metal.

2. Method of producing refractory moulds which comprises preparing an aqueous slurry comprising a refractory filler and an inorganic non-flammable binder and a gelling accelerator, pouring said slurry over a pattern, allowing the slurry to gel with a minimum of disturbance, immediately separating the gelled mass of the slurry from the pattern, and immediately heating the gelled mass to rapidly drive off water in vapor form, thereby to fix the external mould dimensions and obtaining a mould having an interior structure of micro-cracks which will not allow cast metal to fill the crack formation, but which will facilitate the ready escape of gases during the casting of metal.

3. Method in accordance with claim 2 wherein the binder is an inorganic silicate.

4. Method in accordance with claim 2 wherein the binder is sodium silicate.

5. Method in accordance with claim 2 wherein the binder is potassium silicate.

6. Method of producing refractory moulds which comprises preparing an aqueous slurry comprising a refractory filler and an inorganic non-flammable binder and a gelling accelerator, pouring said slurry over a pattern, allowing the slurry to gel, immediately separating the gelled mass of the slurry from the pattern, placing the separated gelled mass upon a supporting surface to allow application of heat to all sides of the said gelled mass, and immediately heating the gelled mass to rapidly drive off water in vapor form, thereby to fix the external mould dimensions and obtaining a mould having an interior structure of micro-cracks which will not allow cast metal to fill the crack formation, but which will facilitate the ready escape of gases during the casting of metal.

7. Method of producing refractory moulds which comprises preparaing an aqueous slurry comprising a refractory filler and an inorganic non-flammable binder and a gelling accelerator, pouring said slurry over a pattern, allowing the slurry to gel with a minimum of disturbance, immediately separating the gelled mass upon a supporting surface to allow application of heat to all sides of the said gelled mass, and immediately heating the gelled mass to rapidly drive off water in vapor form, thereby to fix the external mould dimensions and obtaining a mould having an interior structure of micro-cracks which will not allow cast metal to fill the crack formation, but which will facilitate the ready escape of gases during the casting of metal.

8. Method in accordance with claim 7 wherein the binder is an inorganic silicate.

9. Method in accordance with claim 9 wherein the binder is sodium silicate.

10. Method in accordance with claim 7 wherein the binder is potassium silicate.

11. Method in accordance with claim 7 wherein the binder is a sol prepared from sodium silicate.

12. Method in accordance with claim 7 wherein the binder is a sol prepared from potassium silicate.

13. A mould as produced in accordance with the method of claim 2.

14. A mould as produced in accordance with the method of claim 12.

15. Method of producing refractory moulds which comprises preparing an aqueous slurry comprising a refractory filler and an inorganic non-flammable binder and a gelling accelerator, pouring said slurry over a pattern, allowing the slurry to gel with a minimum of disturbance, immediately separating the gelled mass of the slurry from the pattern, and immediately heating the surface of said gelled mass to rapidly drive off water in vapor form, thereby to fix the external mould dimensions and obtaining a mould having an interior structure of micro-cracks which will not allow cast metal to fill the crack formation, but which will facilitate the ready escape of gases during the casting of metal.

References Cited in the file of this patent

UNITED STATES PATENTS

| | | |
|---|---|---|
| 1,981,403 | Weitzenkorn | Nov. 20, 1934 |
| 2,380,945 | Collins | Aug. 7, 1945 |
| 2,388,299 | Thielemann | Nov. 6, 1945 |
| 2,441,695 | Feagin et al. | May 18, 1949 |
| 2,496,170 | Mann | Jan. 31, 1950 |
| 2,518,040 | Mann | Aug. 8, 1950 |
| 2,652,609 | Sudia | Sept. 22, 1953 |

OTHER REFERENCES

Iron Age, November 9, 1944, pages 56–58 relied on.